United States Patent [19]

Mori

[11] Patent Number: 4,580,756
[45] Date of Patent: Apr. 8, 1986

[54] BALANCING DEVICE

[76] Inventor: Kei Mori, 3-16-3-501, Kaminoge, Setagaya-ku, Tokyo, Japan

[21] Appl. No.: 628,694

[22] Filed: Jul. 6, 1984

[30] Foreign Application Priority Data

Aug. 22, 1983 [JP] Japan ................. 58-152887

[51] Int. Cl.[4] .............................. F16M 1/00
[52] U.S. Cl. .................... 248/550; 248/180; 248/184; 343/765
[58] Field of Search ............ 248/550, 371, 183, 184, 248/180, 182; 343/765, 766, 882

[56] References Cited

U.S. PATENT DOCUMENTS

| 2,199,294 | 4/1940 | Seligmann . | |
|---|---|---|---|
| 2,956,761 | 10/1960 | Weber | 248/550 |
| 3,006,197 | 10/1961 | Kenyon et al. . | |
| 3,163,039 | 12/1964 | Newman et al. | 248/184 |
| 3,355,954 | 12/1967 | Levine et al. . | |
| 3,638,502 | 2/1972 | Leavitt et al. . | |
| 3,765,631 | 10/1973 | Herbst et al. | 248/184 |
| 4,109,640 | 8/1978 | Smith | 248/180 |
| 4,118,707 | 10/1978 | Yoshida et al. | 343/765 |
| 4,193,308 | 3/1980 | Stuhler et al. . | |
| 4,197,548 | 4/1980 | Smith et al. | 343/765 |
| 4,278,031 | 7/1981 | Dangschat | 248/180 |
| 4,295,621 | 10/1981 | Sirys | 343/765 |
| 4,324,378 | 4/1982 | Groutage | 248/184 |
| 4,442,435 | 4/1984 | Kiryu et al. . | |
| 4,490,724 | 12/1984 | Bickman | 343/766 |
| 4,498,038 | 2/1985 | Malueg | 248/550 |

Primary Examiner—Ramon S. Britts
Assistant Examiner—Ramon O. Ramirez
Attorney, Agent, or Firm—Jordan and Hamburg

[57] ABSTRACT

A balancer which carries a solar ray collecting device and decreases or eliminates the rocking motion applied to solar ray collecting device, as for instance, in the case of utilizing a solar ray collecting device on a violently rocking place in a ship or the like. By using such a balancer, the solar ray collecting device can always effectively collect the solar rays without being affected by the rocking motion of the ship or the like.

10 Claims, 3 Drawing Figures

BALANCING DEVICE

BACKGROUND OF THE INVENTION

The present invention relates to a balancer, particularly, a balancer which carries any device or a solar ray collecting device and decreases or lightens the rocking motion applied to the solar ray collecting device as for example, in the case of utilizing the solar ray collecting device in a violently rocking part of a ship or the like.

By using such a balancer, the solar ray collecting device can always effectively collect solar rays without being affected by the rocking motion of a ship or the like.

The present applicant has previously proposed a solar ray collecting device in which the solar rays are focused by a lens or the like and guided into an optical conductor in order to transmit them to an optional desired place for the purpose of illumination, etc. When the afore-mentioned solar ray collecting device is installed in a vessel which cruises out at sea, and light-composition germs or bacteria are cultivated in the vessel or the solar energy is stored in an inductive substance, the solar energy can be employed more effectively than before the advent of this new device. However, the afore-mentioned solar ray collecting device is automatically controlled precisely so as to always direct the light-receiving surface of the lenses toward the sun, and therefore the lens-surface is likely to fail in following the direction of the sun in the case of installing the solar ray collecting device in a violently rocking part of the vessel. It follows that the solar rays cannot be effectively collected under such conditions. Such a problem has existed without a solution-up to the introduction of this invention.

SUMMARY OF THE INVENTION

It is therefore an object of the present invention to provide a balancer for carrying any device and thereby reducing or eliminating the usual rocking motion.

It is another object of the present invention to provide a balancer for carrying a solar ray collecting device and thereby reducing or eliminating the usual rocking motion.

It is another object of the present invention to provide a balancer for reducing or eliminating the rocking motion of a device which is installed on a violently rocking place such as a vessel, etc.

It is another object of the present invention to provide a structure to more effectively collect solar rays.

A balancer for carrying any device or a solar ray collecting device, is comprised of a foundation, a first rotatable shaft installed on said foundation, a first motor for rotating said first rotatable shaft, a cylindrical member fixed at the top portion of said first rotatable shaft so as to have a shaft which is perpendicular to said first rotatable shaft, a second rotatable shaft passing through the center shaft of said cylindrical member, a movable carrying table supporting said second rotatable shaft, a second motor installed on said carrying table for rotating said second rotatable shaft, a third rotatable shaft passing through said second rotatable shaft at the cross point of the elongated line of said first rotatable shaft and said second rotatable shaft, both ends of which are rotatably supported by said cylindrical member, a third motor installed on said cylindrical member for rotating said third rotatable shaft, and a three dimensional acceleration meter mounted on said foundation, the position of said carrying table being kept horizontal by controlling said first motor, second motor, and third motor in accordance with the output signal generated by said three dimensional acceleration meter.

The above and other objects, features and advantages of the present invention will become apparent from the following detailed description taken with the accompanying drawings.

DESCRIPTION OF THE PREFERRED EMBODIMENTS

The present invention relates to a balancer, particularly, a balancer which carries a solar ray collecting device and decreases or lightens the rocking motion applied to it as for example in the case of installing a solar ray collecting device in a violently rocking place such as a ship or the like.

By using such a balancer, the solar ray collecting device can always effectively collect solar rays without being affected by the rocking motion of the ship or the like.

The present applicant had previously proposed a solar ray collecting device in which the solar rays were focused by a lens and guided into an optical conductor for the purpose of transmitting the solar ray to an optional desired place for the purpose of illumination, etc.

Figure 1:
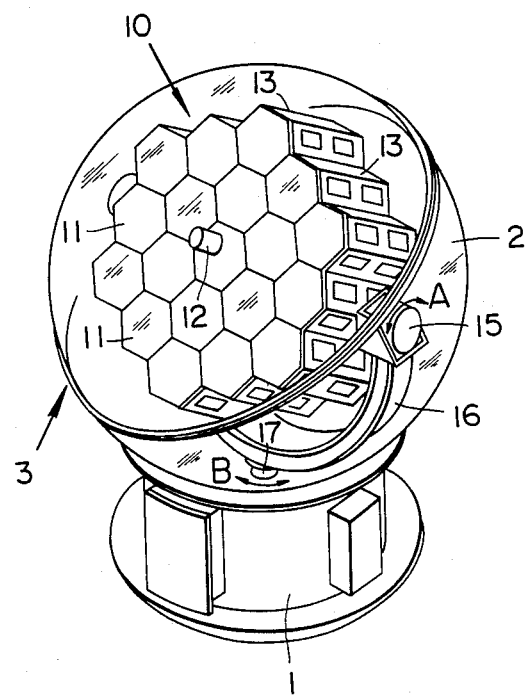
FIG. 1 is a perspective view for explaining an embodiment of the solar ray collecting device proposed previously by the present applicant.

FIG. 1 is a perspective view for explaining an embodiment of the solar ray collecting device proposed previously by the present applicant. In FIG. 1, 1 is a cylindrical foundation, and 2 is a transparent dome-shaped cover. The foundation and cover make up the capsule 3. In the case of employing a solar ray collectng device 10, the device 10 is accommodated in the capsule 3 as shown in FIG. 1.

The solar ray collecting device 10 comprises a large number of (for instance, 19 pieces of) lenses 11 arranged concentrically for focusing the solar rays, a solar ray direction sensor 12 for sensing the direction of the sun, a supporting frame 13 for unitarily supporting the lenses and the sensor, a first motor 15 for rotating the supporting frame with the others supported thereby as shown by an arrow A, a supporting arm 16 for supporting the lenses 11, the sensor 12, the supporting frame 13 and the motor 15, the rotatable shaft 17 arranged perpendicularly to the rotatable shaft of the motor 15 and a second motor (not shown in FIG. 1) for rotating the rotatable shaft 17 as shown by arrow B.

The solar ray direction sensor 12 senses the direction of the sun and creates a detection signal. The first and second motors are so controlled as to direct the lenses toward the sun. The solar rays focused by the lenses 11 are guided into a large number of optical conductor cables not shown in FIG. 1 (19 cables in the embodiment of FIG. 1), the light-receiving end of which is arranged at the respective focal positions of the lenses. Then the solar rays are transmitted through the optical conductor cable to an optional desired place. Furthermore, when the afore-mentioned solar ray collecting device is installed on a vessel which cruises out on the sea, and, for example, light-composition germs or bacteria are cultivated in the vessel or the solar energy is stored in an inductive substance, the solar energy can be employed more effectively than before due to this invention.

However, the afore-mentioned solar ray collecting device is automatically controlled precisely so as to always direct the light-receiving surface of the lenses toward the sun as mentioned before, and therefore the lens surface is likely to fail in following the direction of the sun in the case of installing the solar ray collecting device on a violently rocking place such as a vessel, etc. It follows that the solar rays cannot be effectively collected under such conditions. Such a problem has existed without a solution.

Figure 2:
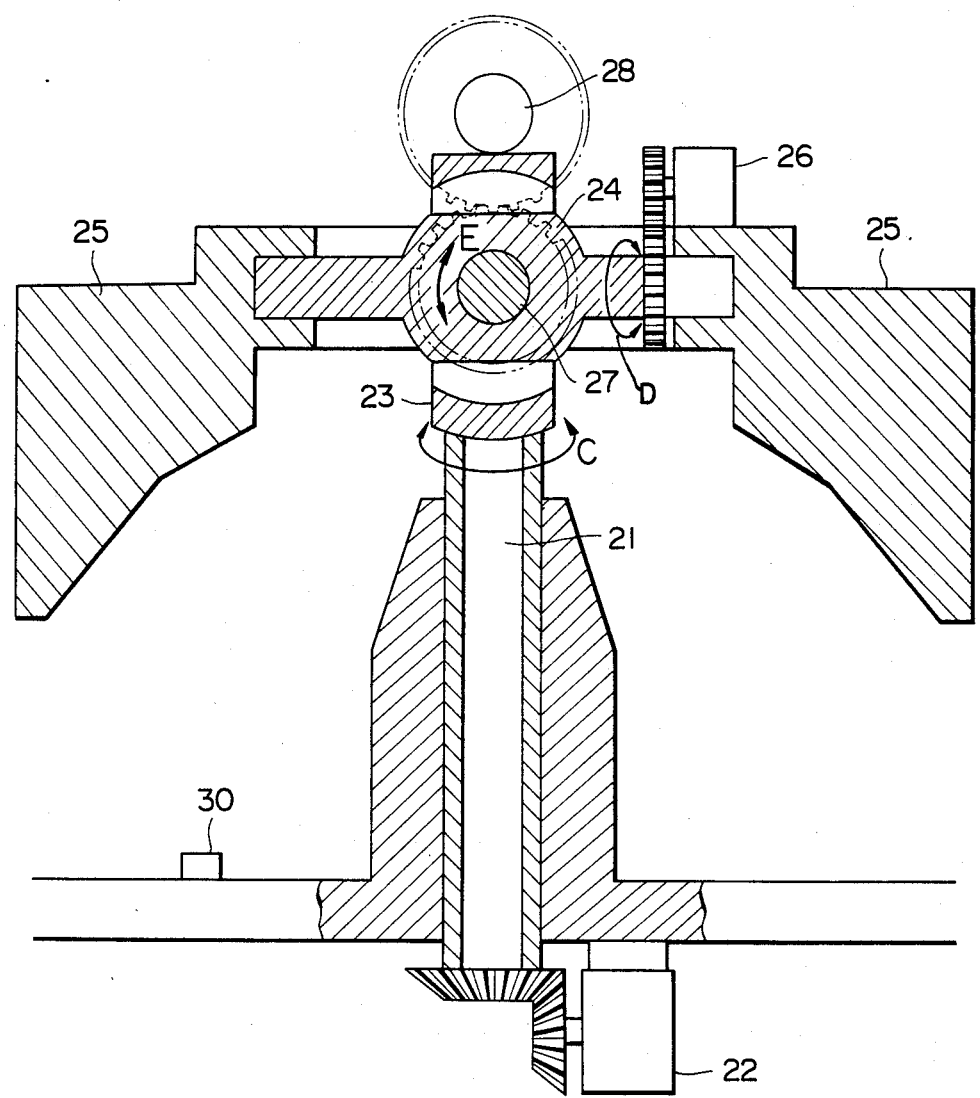
FIGS. 2 and 3 are cross-sectional views of the construction for explaining an embodiment of a balancer according to the present invention.
Figure 3:
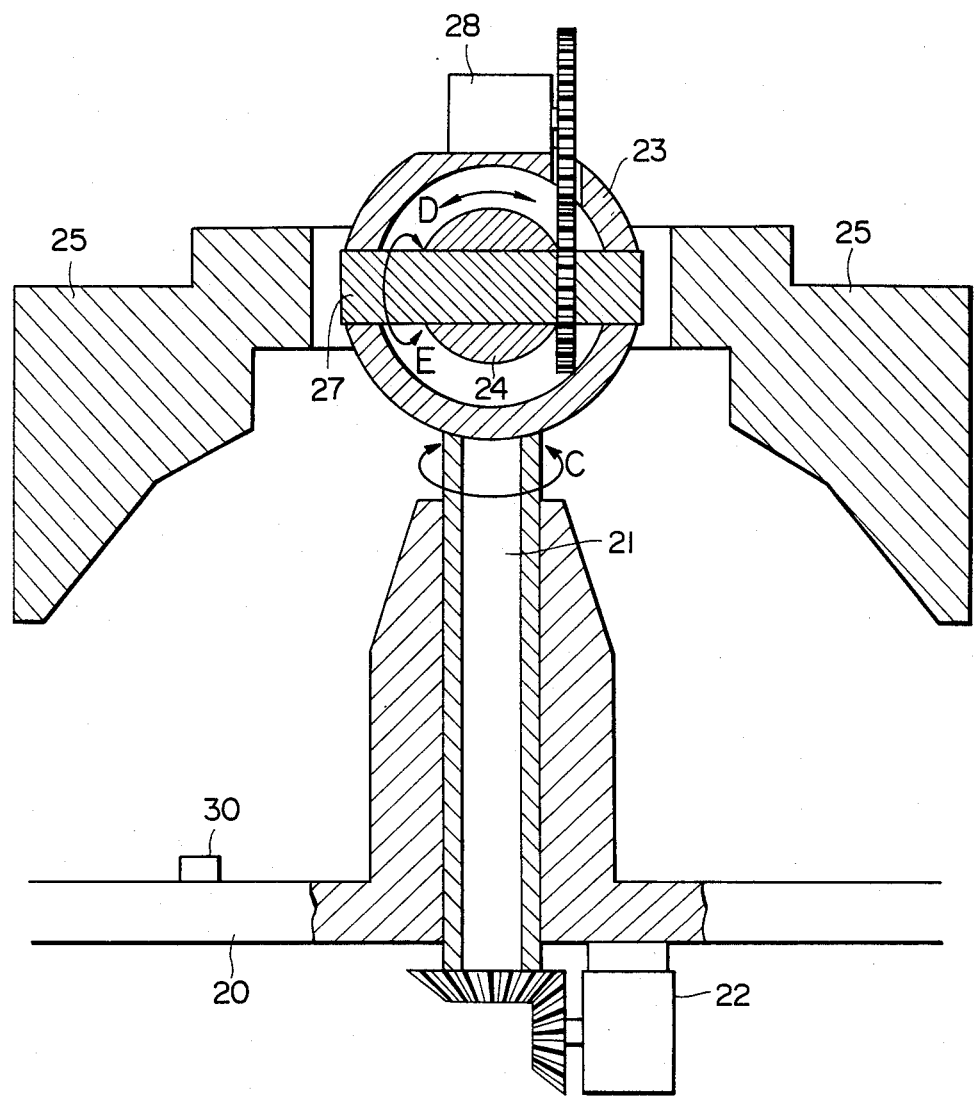

FIG. 2 is a cross-sectional view of the construction for explaining an embodiment of a balancer according to the present invention. FIG. 3 is a cross-sectional view of the construction for explaining the same in the case of rotating a first rotatable shaft 21 by 90°. In FIG. 2 and FIG. 3, 20 is a foundation fixed on the deck of the vessel, etc., 21 a first rotatable shaft installed on the foundation 20, 22 a first motor for rotating the first rotatable shaft 21, 23 a cylindrical member fixed at the top portion of the first rotatable shaft 21 so as to have a shaft in the direction perpendicular to the first rotatable shaft, 24 a second rotatable shaft passing through the center shaft of the cylindrical member, 25 a movable carrying table supporting the second rotatable shaft rotatably, 26 a second motor for rotating the second rotatable shaft, 27 a third rotatable shaft passing through the second rotatable shaft 24 at the cross point of the elongated line of the first rotatable shaft 21 and the second rotatable shaft 24 and being perpendicular to the second rotatable shaft 24, 28 a third motor for rotating the third rotatable shaft 27, both ends of the third rotatable shaft 27 being rotatably supported by the cylindrical member 23. The carrying table 25 is rotated by the first rotatable shaft 21 as shown by arrow C, rotated by the second rotatable shaft 24 as shown by arrow D, and rotated by the third rotatable shaft 27 by arrow E. In other words, the carrying table can be rotated freely in three dimensional planes. 30 is a three dimensional acceleration meter mounted on the foundation 20. The output signal generated by the three dimensional acceleration meter controls the afore-mentioned first through third motors 22, 26 and 28 so that the position of the carrying table 25 can always be kept approximately parallel. Consequently, when the solar ray collecting device is carried on the carrying table 25, the solar ray collecting device can always collect the solar rays without being effected by the rocking motion of a vessel, etc.

According to the present invention, since the first, second and third rotatable shafts 21, 24 and 27 are so constructed that the respective shaft lines thereof intersect together at a common point, the balancer can be constructed compactly. Furthermore, the first rotatable shaft 21, the cylindrical member 21, the second rotatable shaft 24, and the third rotatable shaft 27 can be constructed unitarily. Those parts manufactured (processed) precisely can be constructed in a block different from such large-scaled parts as the foundation 20, the carrying table 25, and so on. As a result the manufacturing, transporting, and assembling can be done quite easily.

One application of the balancer is for carrying a solar ray collecting device, but such a method of carrying something on a balancer is not limited to that application only. For example, it may be possible to carry the transmitter and receiver devices employed for optical communication on a balancer. Furthermore, it may also be possible to install the balancer on the car equipped with a photographic equipment that is being transported, carry a camera on a balancer, and to use the camera for taking photographs while in transit.

As is apparent from the foregoing description, in the case of employing the solar ray collecting device carried on the balancer according to the present invention, solar rays can be effectively collected and utilized even on a violently rocking place such as a vessel or the like.

What is claimed is:

1. A balancer comprising a foundation, a first rotatable shaft rotatably mounted on said foundation, a first motor mounted on said foundation for rotating said first shaft, said first shaft having an end portion, a cylindrical member mounted on said end portion, said cylindrical member having an axis which is perpendicular to the axis of said first shaft and which intersects the axis of said first shaft at a point of intersection, a second rotatable shaft having an axis axially aligned with the axis of said cylindrical member such that said axis of said second shaft passes through said point of intersection, a carrying table supported by said second shaft, a second motor mounted on said carrying table for rotating said second shaft, a third rotatable shaft having an axis which passes through said point of intersection, said third shaft being rotatably supported by said cylindrical member, and a third motor mounted on said cylindrical member for rotating said third shaft, whereby said carrying table is maintainable in a horizontal disposition as the disposition of said foundation varies as said first, second and third motors rotate said first, second and third shafts respectively.

2. A balancer according to claim 1 further comprising a three-dimensional acceleration meter mounted on said foundation and operable to generate signals to control said first, second and third motors to thereby maintain said carrying table in said horizontal disposition.

3. A balancer according to claim 1 wherein said third shaft rotatably supports said second shaft.

4. A balancer according to claim 1 wherein said second shaft has a transverse opening, said third shaft passing through said transverse opening.

5. A balancer according to claim 1 wherein the axis of said third shaft is perpendicular to the axis of said second shaft.

6. A balancer according to claim 1 wherein said third shaft has two end portions each of which is rotatably supported by said cylindrical member.

7. A balancer according to claim 1 wherein said first shaft extends perpendicularly from said foundation.

8. A balancer according to claim 7 wherein said cylindrical member is mounted on the upper end of said first shaft.

9. A balancer comprising a foundation, a first shaft rotatably mounted on said foundation, a first motor mounted on said foundation for rotating said first shaft, said first shaft having an end portion, a cylindrical member mounted on said end portion, said cylindrical member having an axis which is perpendicular to the axis of said first shaft and which intersects the axis of said first shaft at a point of intersection, a second shaft having an axis axially aligned with the axis of said cylindrical member such that said axis of said second shaft passes through said point of intersection, a carrying table supported by said second shaft, a second motor mounted on said carrying table for rotating said second shaft, a third rotatable shaft having an axis which passes through said point of intersection, said third shaft being rotatably supported by said cylindrical member, a third motor mounted on said cylindrical member for rotating said third shaft, and a three-dimensional acceleration meter mounted on said foundation and operable to generate signals to control said first, second and third motors, whereby said three-dimensional acceleration meter provides said signals to said first, second and third motors to rotate said first, second and third shafts respectively to thereby maintain said carrying table in a horizontal disposition as the disposition of said foundation varies.

10. A balancer according to claim 9 wherein said first, second and third shafts and said cylindrical member are assembled as a unit assembly.

* * * * *